Dec. 15, 1959     F. BARTON     2,916,973
MACHINE FOR SHAPING AXIAL-FLOW BLADES
Filed Jan. 24, 1955     5 Sheets-Sheet 1

United States Patent Office 2,916,973
Patented Dec. 15, 1959

2,916,973

MACHINE FOR SHAPING AXIAL-FLOW BLADES

Frank Barton, Coventry, England, assignor to Armstrong Siddeley Motors Limited, Coventry, England Application January 24, 1955, Serial No. 483,560

Claims priority, application Great Britain January 30, 1954

8 Claims. (Cl. 90—55)

This invention relates to a machine for shaping axial-flow blades (for example, for a turbine, or more particularly for a compressor, of a gas turbine engine), of the kind in which both faces of the blade are simultaneously machined during movement in one direction of reciprocable cutting tools under control of appropriately-shaped patterns engaged by followers associated with the cutting tools, the blade being fed or "travelled" after each longitudinal cut in a direction at right-angles to the machining direction.

It is convenient that the tools should be reciprocated in a horizontal direction, and that the "travelling" of the blade between cuts should be effected in a vertical direction. Obviously, the tools should be arranged to be operatively clear of the blade after the completion of each cut, i.e., as or before they commence their return strokes.

The main object of the invention is to produce a machine with which such blades can be shaped economically and with accuracy at a greater speed than is at present possible.

It may here be mentioned that, when machining only one face of a blade, it is known to arrange an appropriately-shaped pattern in opposition to the face of the blade which is to be machined, a stylus or other follower (preferably a roller) which engages the said pattern being fast and in line with the tool which engages the blade during the cut.

The invention broadly consists in that the tools are carried by reciprocable rigid arms and arranged so as always to engage the blade at substantially opposite points during each movement of the tools in the cutting direction, the tools being fast with the followers engaging the associated patterns, the latter being arranged co-extensively with the blade and spaced from one another with the blade between them.

According to a further feature of the invention, each of the rigid arms carries two relatively movable transverse slides, one for the tool and the other for the associated follower, which are locked together during movement of the tools in the machining direction, and released for the return stroke.

Referring to the drawings.

Figure 4:
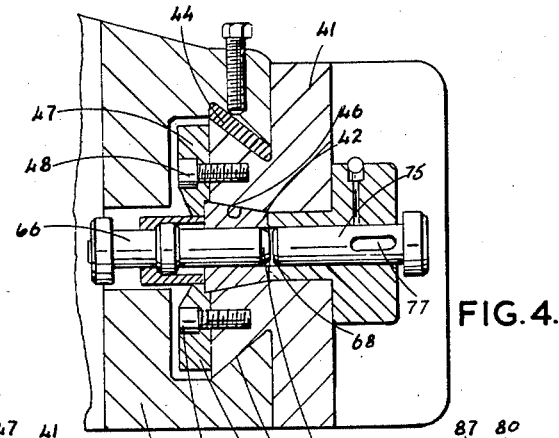
Figures 5, 6:
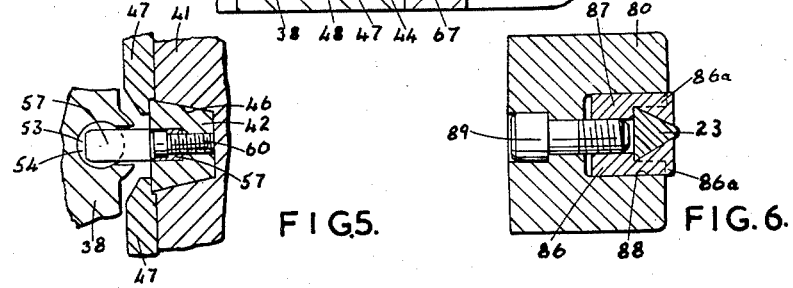
Figure 3:
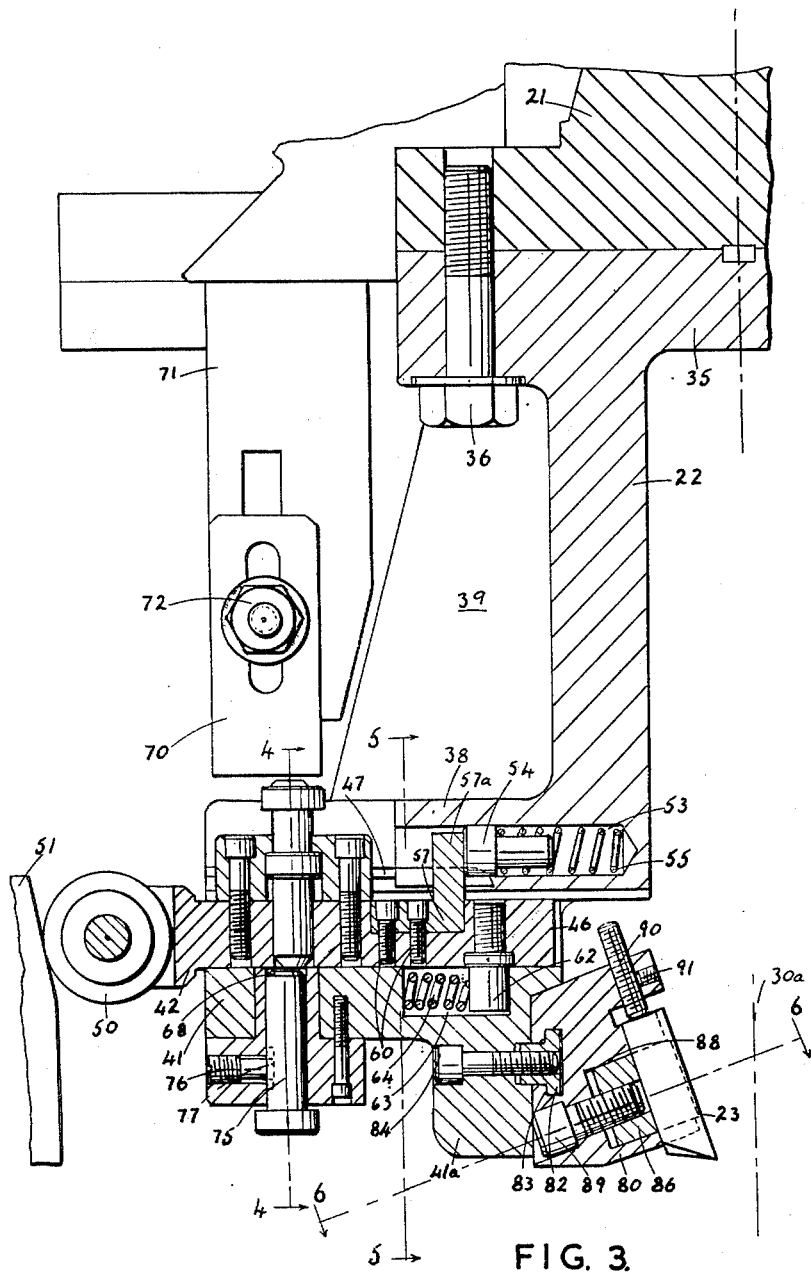
Figure 3 is a sectional plan of one of the rigid tool carrying arms, and its associated transverse slides.
Figure 7:
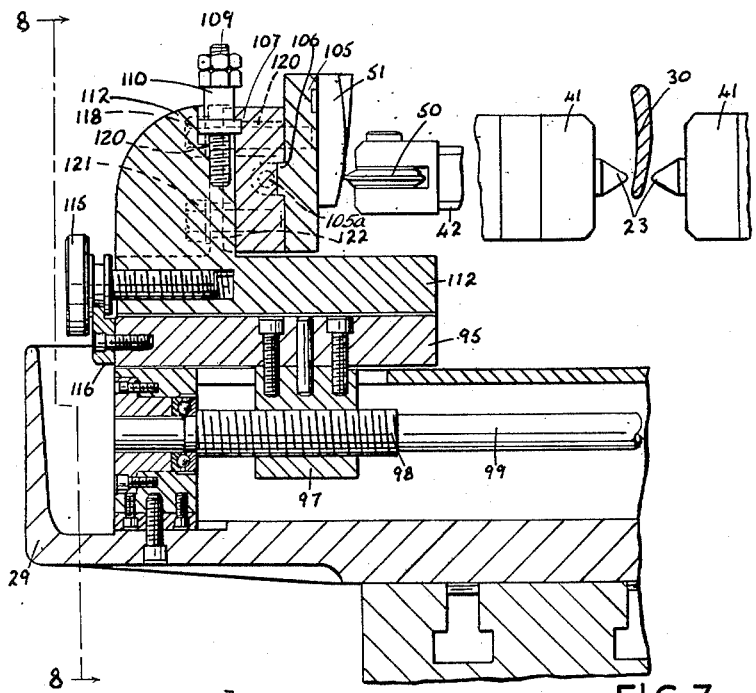
Figure 8:
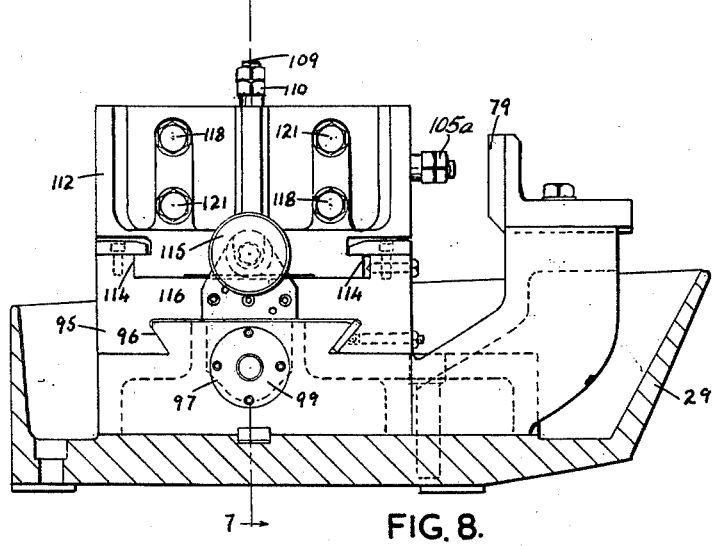
Figure 9:
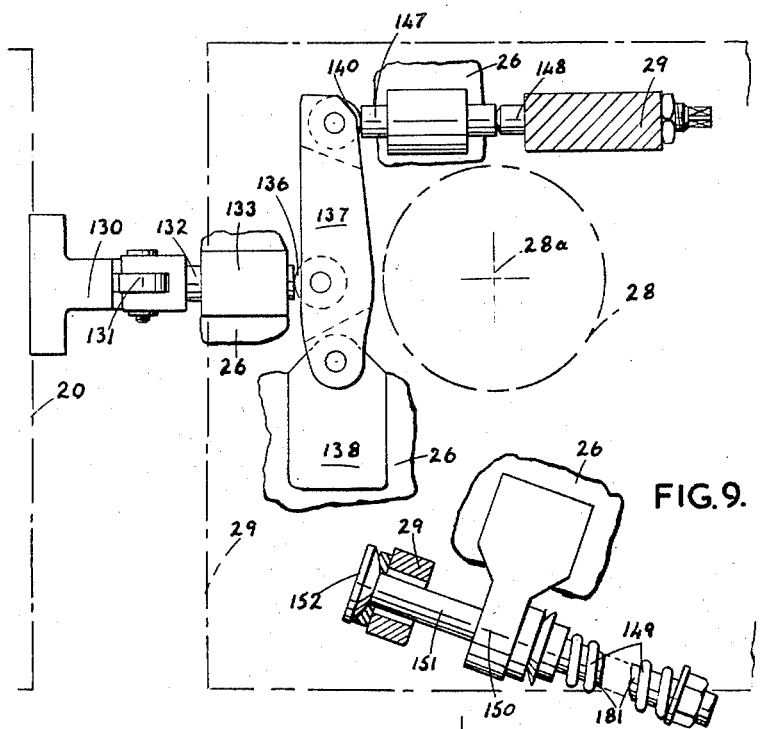
Figure 10:
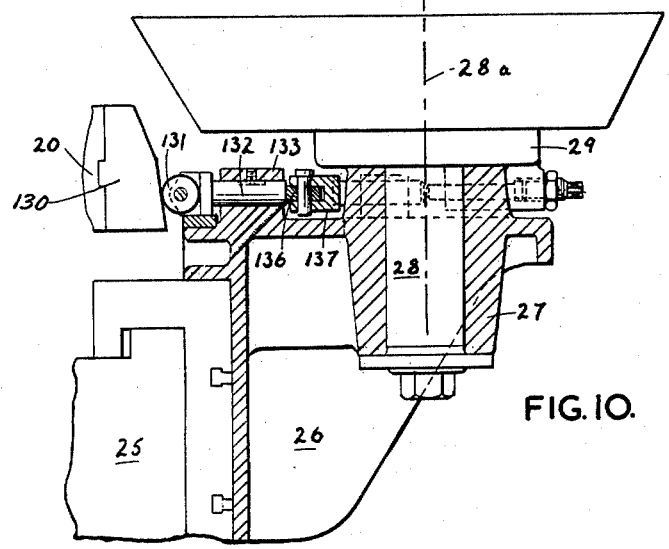

Figures 4, 5 and 6 are sections taken on the lines 4—4, 5—5 and 6—6 of Figure 3, Figure 5 being a fragmentary section;

Figure 7 is a section taken on the line 7—7 of Figure 8, and Figure 8 is a section taken on the line 8—8 of Figure 7; these two figures, to different scales, showing in detail a support for a pattern;

Figure 9 is a diagrammatic plan of means for angularly moving a table, hereinafter described, on which a blade to be machined is mounted; and Figure 10 is a diagrammatic sectional side elevation, to a smaller scale, corresponding to Figure 9.

Figure 1:
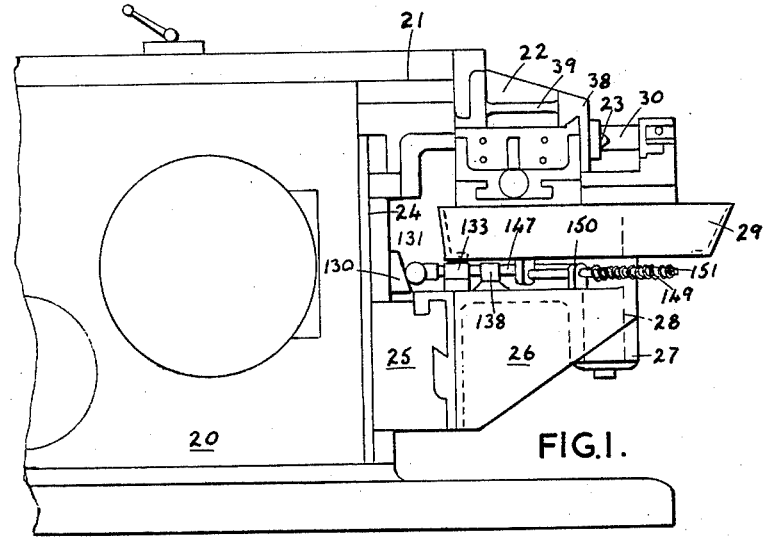
Figure 1 is a fragmentary side elevation of a machine according to the invention.

Referring to Figure 1, the machine includes a base 20 which houses any known form of means for reciprocating a horizontal slide 21 carrying rigid arms 22 on which are mounted the cutting tools, one of which is indicated at 23. Mounted on vertical guides 24 of the base 20 is a slide 25, which, in a known manner, is raised a predetermined amount during each return stroke of the slide 21.

The slide 25 carries a horizontal slide 26 which supports a vertical barrel 27 in which a vertical shaft 28 is journalled, and the shaft 28 supports the table 29 on which the blade (indicated at 30) is mounted. Figure 1 also shows the means, later described in detail, for angularly moving the table.

As will be seen from Figure 3, the arms 22 are formed integrally with a bridging portion 35 which is secured to the slide 21 by bolts 36, and the arms have outwardly-extending, co-planar ends 38 which are additionally connected to the portion 35 by webs 39.

Each of the ends 38 carries two transverse slides 41, 42. The main transverse slide 41 is guided in dovetails 44 (Figure 4) formed in the end 38, and carries, in a manner later described, a mountinfi for the tool 23. The other transverse slide, 42, is guided in a slot 46 in the slide 41, and is secured therein by plates 47, 47 which are screwed at 48 to the body of the main slide, the slide 42 carrying a roller 50 which engages a pattern, indicated at 51 and later described in detail.

Figure 2:
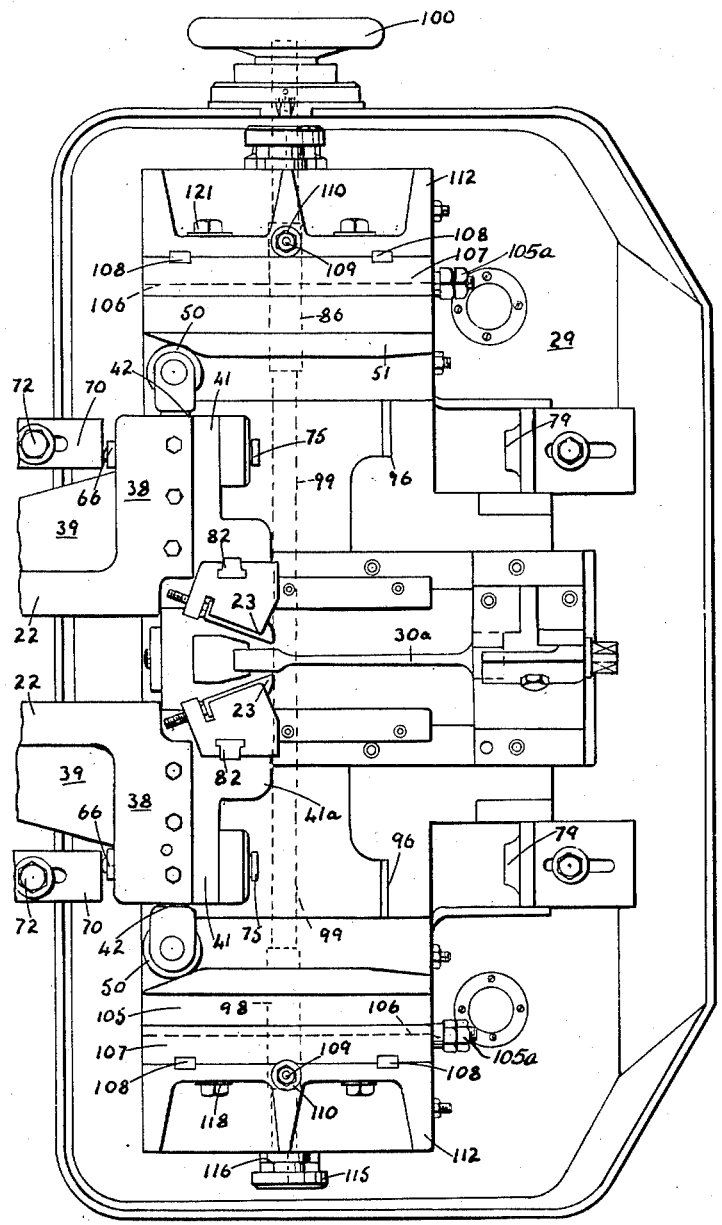
Figure 2 is a fragmentary plan view, to a larger scale, of the right hand portion of Figure 1.

Each of the transverse slides, 41, 42 is biassed towards the associated pattern, and, for this purpose a bore 53 is provided in the end 38 in which is received a plunger 54 acted on by a spring 55. The slide 42 carries an L-shaped bracket 57 having a limb 57a extending into a slot 58 in the wall of the bore 53, the limb 57a being engaged by the plunger 54. The bracket 57 is shown as secured to the slide 42 by screws 60. In this way the roller 50 and a pin 62 (which is carried by the slide 42 and received in a slot 63 of the slide 41) are biassed towards the pattern 51, the pin 62, through the intermediary of a spring 64, acting on the slide 41 to bias it to a position in which the tool 23 is withdrawn from the blade towards the former 51. The slides 41, 42 are in this position during a return movement of the tools. In Figures 2 and 3 the blade 30 is indicated by the chain line 30a.

To lock the two slides 41, 42 together during cutting action, the slide 42 carries a slidable locking peg 66 with a bevelled or like end 67 disposed against a hole 68 of the same diameter in the slide 41, though the peg and the hole are not quite in alignment, as shown in Figure 3, when the tool 23 is withdrawn from the blade. On the completion of the return stroke of the tool and associated parts, the slidable peg 66 engages an abutment 70 which forces it into the hole 68 in the slide 41, thereby bodily moving the slide 41 against the bias of the spring 64, the chamfer 67 on the slidable peg being sufficient to effect this motion. The stops 70 are shown as secured to a stationary part 71 of the machine by bolts 72.

As the tool travels forward for its machining cut, therefore, the two slides 41, 42 are locked to one another, by the positive engagement of the peg 66 in the hole 68.

The hole 68 in the tool slide 41 also carries a pin 75 having a head which extends beyond the remote face of the slide, and the action of forcing the slidable peg 66 into the hole 68 as described above partially forces out the pin 75 from the said hole, a key 76, fast with the slide 41 and engaging in a slot 77 in the pin 75, being provided for limiting the axial movement of the said pin.

On the completion of the cut the head of the pin 75 engages an abutment 79 (see Figures 2 and 8) by which it is forced fully into the hole 68 thereby driving out the slidable locking peg 66, whereupon the spring 64, reacting between the slide 41 and the pin 62, acts on the slide 41 to withdraw the tool 23 from the blade and provide the requisite "tool relief" for the return stroke of the tool.

As shown, the mounting for the tool on the slide 41 is one which will allow of the release of a block 80 carrying the tool in order that the tool may be re-ground when necessary away from the machine, after which it is re-set in the block, and the block then re-mounted on the slide 41. To allow for this being done, the block 80 is secured to the slide 41 by T nuts 82 received in a slot 83 of the block, the nuts receiving bolts 84 which are passed through a boss 41a of the slide 41. Thus, by slackening off the bolts 84, the block 80 can be withdrawn, axially of its slot 83, from the nuts 82. The nuts may be formed integrally by a single bar of T section. Naturally, provision is made for ensuring the accurate positioning of the cutting edge of the tool after a re-grinding operation of this character, and for this purpose the tool is detachably secured to the block by a clamp 86. As will be seen from Figure 6, the tool 23 is of triangular cross section, and the clamp is formed with jaws 86a which have a complementary contour at their surfaces which engage the tool. The clamp is received in a hole 88 in the block, and is drawn by a screw 89 into the hole to effect the clamping by drawing the tool firmly into contact with the block. For effecting fine longitudinal movements of the tool a screw 90 is provided, the screw being locked in an adjusted position by a grub screw 91 (see Figure 3).

Referring now to Figures 2, 7 and 8, the patterns 51 are mounted in adjustable fixtures on the table 29 which is formed as a tray-like structure which collects the swarf and suds. As will be well understood, provision is made for simultaneous movement of the patterns towards one another, when the blade surface has been completely machined with a chosen depth of cut, in order to provide an "in-feed" for a subsequent cut if this is necessary. For this purpose the fixtures 95 supporting the patterns 51 from the tray-like structure are mounted on dovetail guides 96 and are provided with nuts 97 of opposite hand which are engaged with corresponding screw-threads 98 on a shaft 99 provided at one end with an actuating handle 100, whilst individual provision is made for setting up each of the patterns. Each pattern 51 is mounted, as by screws (not shown) on a base plate 105 having a tongue 106 by which it can be accurately positioned on a slide 107 (Figures 2 and 7). The slide 107 is provided with ways for keys 108, on which it can be slid in a vertical direction, and a conventional stud and nut mechanism 109, 110 is provided for enabling the slide 107 to be accurately vertically-positioned by adjustment of the nut. A similar mechanism 105a is provided for moving the slide 105 in a horizontal direction along the slide 107. The stud and nut mechanism is mounted on a slide 112, which can be moved in a horizontal direction towards or away from the blade along ways 114 in the slide 95 by a screw 115, the screw being held captive by a plate 116 mounted on the slide 95. The base plate 105 has threaded holes in which the ends of bolts 118 are received, the bolts extending through clearance holes 120 in the slides 107, 112, whereby the plate can be locked in an adjusted position. The slide 107 is provided with similar holes in which bolts 121 are received, the bolts passing through vertical slots 122 in the slide 112 whereby the slide 107 can be additionally locked to the slide 112.

The tray-like structure 29 is mounted on the vertically movable base 25, 26 which, as previously mentioned, is "travelled" upwardly after each longitudinal cut. For dealing with a twisted blade, such as may be required for the turbine of a gas turbine engine, it is important to maintain the tool attitude correct with reference to the blade, not only as regards the tool rake angle, but also as regards the tool clearance angle by ensuring that the cutting edges of the tools engage the blade on exactly opposite points lying in a plane normal to the faces of the blade. This is effected first by arranging for the neutral transverse axis of the blade to be substantially coincident with the axis of the vertical shaft 28 which carries the tray-like structure and operates in the bore of the barrel 27, the axis of the shaft being indicated at 28a in Figures 9 and 10. Then, throughout the operational cycle of machining the blade, the vertical shaft (with the tray-like structure) is progressively moved about its axis, after each individual cut has been taken, so as to present that longitudinal section of the blade which is next to be machined directly in alignment with the direction of movement of the slide 21, thereby to ensure a substantially constant cutting condition with reference to tool clearance and rake angles.

For this purpose, use is made of a fixed vertical cam 130 co-operating with a roller 131 on a horizontally movable stem 132 which is reciprocable in a bore in a boss 133 of the slide 26, so that the stem will be slid outwardly each time the slide 25 is "travelled." The other end of the stem is engaged by a roller 136 on a lever 137 pivotally mounted at one end on a bracket 138 fast with the slide 26, the other end having a roller 140 acted on by a rod 147 which in turn is acted on by an abutment 148 fast with the tray-like structure. A strong return spring 149 is provided to turn the tray-like structure anti-clockwise in the drawings about the axis 28a of the shaft 28, the spring reacting between a stop 150, on the slide 26, and the end of a rod 151 which passes through the stop 150 and is coupled to the structure 29 by its end 152. In this way, the abutment 148 acts, through the rod 147 and lever 137, to bias the roller 131 outwardly into contact with the cam 130, which in turn limits the angular displacement of the tray-like structure.

It will be obvious that, in the case of a blade having an opposite twist, the cam 130 will be upwardly curved to the right, instead of to the left as shown in Figure 10. In this event the roller 131 will move in the opposite direction to that described.

In producing a blade for an axial-flow compressor, the blade having a portion to form an integral root platform at one end, it is preferred initially to mill or otherwise machine this end of the blade substantially to shape in the vicinity of the room platform so that the tools can "run out" after taking a cut. The rest of the blade may be of rectangular section.

It is also preferred to leave a "locating" portion at the other or tip end of the blade which can be removed when the blade has been completely formed. This may be arranged for by "relieving" the "entrance" ends of the two patterns 51—which has the additional advantage of allowing the tools to "run in" in a satisfactory manner.

Whereas previous machines for shaping blades have usually or preferably operated on pre-formed forged blanks, the present machine, while capable of doing this, is also capable of producing blades from plain rectangular bars provided with the "relieved" ends to allow the tools to run out, i.e., with very much less preparatory work than has been necessary in the past. This is one important feature of the invention. As stated above, the simple tool attitude correction mechanism is another important feature. So is the method of positively holding in the tools during the cutting strokes.

What I claim as my invention and desire to secure by Letters Patent of the United States is:

1. In a machine for shaping axial flow blades, holding means for a cutting tool, arranged to engage a blade, and for a follower, arranged to engage a pattern positioned alongside the blade, the holding means comprising an arm rigidly mounted on a reciprocatable element of the machine, two transverse slides carried by said arm for longitudinal rectilinear movement relatively of each other, one of said slides arranged to support a tool and the other of said slides supporting said follower, and means for locking the slides together during movement of the tool in the cutting direction and for releasing the slides during the return stroke.

2. Holding means according to claim 1, characterised in that springs are provided which are adapted to bias the transverse slides at all times towards the former.

3. Holding means according to claim 1, in which the transverse slide which carries the tool is adapted to be biassed towards the pattern by a spring reacting between the tool slide and the slide carrying the follower.

4. In a machine for shaping axial flow blades, holding means for a cutting tool, the holding means comprising a tool-supporting arm, two relatively movable transverse slides carried by said arm, one slide adapted to be connected to a tool and the other slide adapted to be connected to a follower engaging a pattern and means for locking the slides together during movement of the tool in the cutting direction and for releasing them during the return stroke, the said locking means including a slidable peg carried by one of the slides and received in a complementary hole in the other slide.

5. Holding means according to claim 4, in which the peg has a bevelled end to facilitate its entry into the complementary hole, when said peg is in a position where it is withdrawn from said hole and the slides are in a position to which they have been moved by their respective biasses, the bevelled end acting as a cam to move the respective slides to a position in which the slides can be locked together by an unbevelled portion of the peg.

6. Holding means according to claim 4, in which the other slide carries a pin in said complementary hole, said pin to be engaged by an abutment by which the pin is forced fully into the hole to drive out the locking peg.

7. Holding means according to claim 6, having means for limiting the axial movement of the pin into the said complementary hole.

8. In a machine for shaping axial flow blades, holding means for a cutting tool, the holding means comprising a tool-supporting arm, two relatively movable transverse slides carried by said arm, one slide adapted to be connected to a tool and the other slide adapted to be connected to a follower engaging a pattern, a spring for biassing the said other slide towards the pattern, said spring engaging a portion of said other slide and said portion extending into a slot in said arm, and means for locking the slides together during movement of the tool in the cutting direction and for releasing them during the return stroke.

References Cited in the file of this patent

UNITED STATES PATENTS

| | | |
|---|---|---|
| 2,065,933 | Blanchard | Dec. 29, 1936 |
| 2,379,370 | Metz | June 26, 1945 |
| 2,451,371 | Backstrom | Oct. 12, 1948 |
| 2,676,521 | Creek et al. | Apr. 27, 1954 |
| 2,712,767 | Silber | July 12, 1955 |